United States Patent
Hinton et al.

(10) Patent No.: US 9,757,793 B2
(45) Date of Patent: Sep. 12, 2017

(54) REINFORCED ELECTROMECHANICAL ACTUATOR HOUSING

(71) Applicant: GOODRICH CORPORATION, Charlotte, NC (US)

(72) Inventors: Jantzen Hinton, Troy, OH (US); Kevin Rehfus, Troy, OH (US); David Drennen, Bellbrook, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1042 days.

(21) Appl. No.: 13/922,590

(22) Filed: Jun. 20, 2013

(65) Prior Publication Data

US 2014/0375179 A1 Dec. 25, 2014

(51) Int. Cl.
| | | |
|---|---|---|
| *B21K 1/26* | (2006.01) | |
| *B21J 5/00* | (2006.01) | |
| *B60T 13/74* | (2006.01) | |
| *F16D 65/18* | (2006.01) | |

(52) U.S. Cl.
CPC .................. *B21J 5/00* (2013.01); *B21K 1/26* (2013.01); *B60T 13/741* (2013.01); *F16D 65/18* (2013.01)

(58) Field of Classification Search
CPC ............. F16D 2125/00; F16D 2125/04; F16D 55/226; F16D 65/18; F16H 25/2204; F16K 31/50; B64C 25/42; B64C 25/44; B64C 13/28; B64C 13/36; B60T 8/1703; B60T 13/741; B60T 13/746; H02K 7/06; H02K 11/24; B21K 1/26; B21K 21/12; F16J 10/00; F16J 10/02; F15B 15/08; F15B 15/14; F15B 15/1442; F15B 15/1423; F15B 15/1428; F15B 15/1438

USPC .............. 310/80, 12.33; 188/72.8, 161–162; 188/322.19; 244/110 A, 111; 74/89.23, 74/89.36; 92/169.2

See application file for complete search history.

(56) References Cited

U.S. PATENT DOCUMENTS

| | | | | |
|---|---|---|---|---|
| 4,211,104 A | * | 7/1980 | Barnabo ................... B21C 3/04 | |
| | | | | 72/467 |
| 4,292,831 A | * | 10/1981 | Simon ..................... B21C 23/14 | |
| | | | | 72/260 |
| 4,694,676 A | * | 9/1987 | O'Brien ................. B21D 53/84 | |
| | | | | 72/256 |

(Continued)

FOREIGN PATENT DOCUMENTS

| | | |
|---|---|---|
| DE | 69519868 | 7/2001 |
| DE | 102006009959 | 10/2007 |
| EP | 1308321 | 5/2003 |

OTHER PUBLICATIONS

Extended European Search Report dated Oct. 29, 2015 in European Application No. 14165499.6.

*Primary Examiner* — Burton Mullins
(74) *Attorney, Agent, or Firm* — Snell & Wilmer, L.L.P.

(57) ABSTRACT

An electromechanical actuator housing assembly comprising a reinforcement ring is disclosed herein. The design of the electromechanical actuator housing assembly may be directed to improving load measurement accuracy. The design of the electromechanical actuator housing assembly may be directed to reducing housing deflections. A method of manufacture of an EMA housing assembly is also disclosed herein. This method may include an electromechanical actuator housing assembly having a reinforcement ring.

8 Claims, 5 Drawing Sheets

(56) References Cited

U.S. PATENT DOCUMENTS

| | | | | |
|---|---|---|---|---|
| 4,865,162 A | * | 9/1989 | Morris | B60T 1/065 |
| | | | | 188/158 |
| 6,199,822 B1 | * | 3/2001 | Hakansson | F02B 37/183 |
| | | | | 251/58 |
| 6,927,513 B2 | * | 8/2005 | Schreier | F16H 25/20 |
| | | | | 310/12.01 |
| 7,273,134 B2 | * | 9/2007 | Schack | F16D 55/226 |
| | | | | 188/1.11 R |
| 7,364,020 B2 | * | 4/2008 | Ante | B60T 17/221 |
| | | | | 188/1.11 E |
| 7,412,956 B2 | * | 8/2008 | Gotou | F15B 15/1428 |
| | | | | 123/193.2 |
| 8,403,116 B2 | * | 3/2013 | Handke | F16F 9/38 |
| | | | | 188/322.19 |
| 2003/0102192 A1 | * | 6/2003 | Kapaan | F16D 65/18 |
| | | | | 188/72.7 |
| 2004/0154877 A1 | * | 8/2004 | Severinsson | B60T 17/22 |
| | | | | 188/1.11 E |
| 2006/0022163 A1 | * | 2/2006 | Anderson | F16K 31/126 |
| | | | | 251/331 |
| 2012/0298455 A1 | * | 11/2012 | Bachon | B60T 13/741 |
| | | | | 188/72.1 |
| 2013/0048443 A1 | * | 2/2013 | Muramatsu | F16D 65/18 |
| | | | | 188/72.1 |
| 2015/0115778 A1 | * | 4/2015 | Drennen | H02K 7/06 |
| | | | | 310/68 B |

* cited by examiner

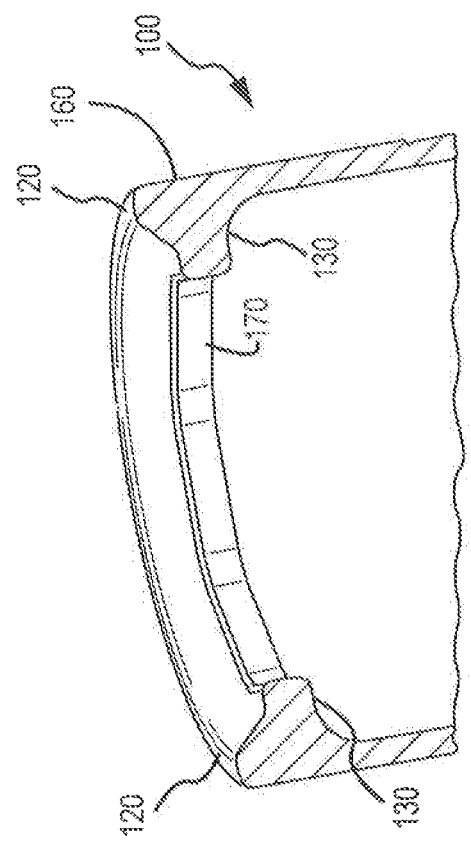
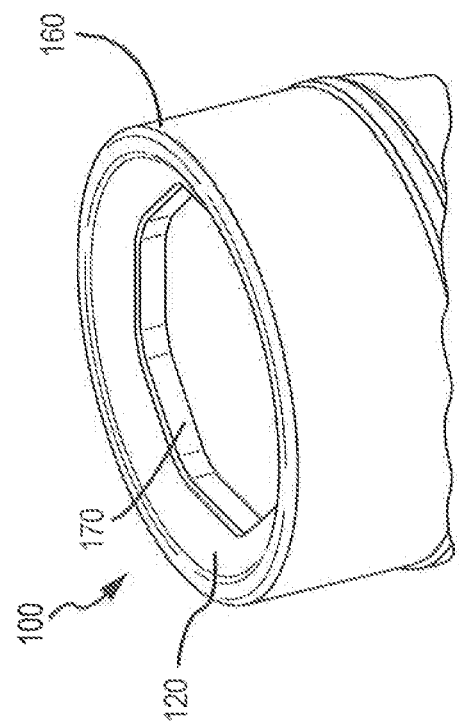
FIG.4A
FIG.4B

REINFORCED ELECTROMECHANICAL ACTUATOR HOUSING

FIELD

The present disclosure is related to electromechanical actuators, and more particularly, to an electromechanical actuator housing assembly for use in an aircraft brake.

BACKGROUND

Electro-mechanical Actuators (EMAs) have been an emerging technology for the last decade in the aerospace brake controls industry. A focus on lightweight components is a constant driving force for aerospace systems. Improved performance and reliability is also desired when designing new aircraft braking systems and elements thereof. The housings that protect these actuators benefit from thoughtful design to meet customer requirements (e.g., strength, weight, size, etc).

SUMMARY

The present disclosure relates to an electromechanical actuator housing assembly designed to address, among other things, the aforementioned deficiencies and attributes in prior art EMA housing assemblies. Systems and methods disclosed herein may be useful in connection with an electromechanical actuator housing assembly. EMAs described herein may comprise a reinforcement ring. Embodiments described herein may be directed to improving load measurement accuracy and extending service life of the housing. Embodiments described herein may be directed to reducing housing deflections and stresses.

A method of manufacture of an EMA housing assembly is also disclosed herein. This method may include manufacture of an electromechanical actuator housing assembly having a reinforcement ring.

BRIEF DESCRIPTION OF THE DRAWINGS

FIG. 4A illustrates an isometric view of the top portion of an EMA housing having a reinforcement ring in accordance with various embodiments of the present disclosure; and FIG. 4B illustrates a cut-away view of the EMA housing of FIG. 4A.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice aspects of the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for electromechanical actuator assemblies. Although the embodiments herein are described with reference to electromechanical actuator assemblies used in connection with aircraft brakes, such embodiments are provided for example only as it is contemplated that the disclosures herein have applicability to other electromechanical actuators and their uses.

EMAs often utilize load cells. A load cell is a device that measures a load. Generally, the quality of the control surface where the load cell is positioned is directly associated with the accuracy of the load calculation/measurement. At times, this measurement is affected by deflection and/or altering/bending of an EMA housing and/or other measurement surface. This deflection of an EMA housing may be reactionary.

EMAs are often used in braking systems, such as aircraft braking systems. With momentary reference to FIG. 2, deflection of aspects of the system, such as surface 130 and/or EMA housing assembly 100, generally leads to inaccurate load cell measurement and may adversely affect dynamic braking response. Thus, the braking response time may be decreased as deflection is reduced. Stated another way, the time it takes for the brakes to function may be decreased. Also, a stiffer system may result as deflection is reduced. Similarly, as deflections are reduced, housing assembly 100 may be made smaller which reduces weight.

Figure 1B:
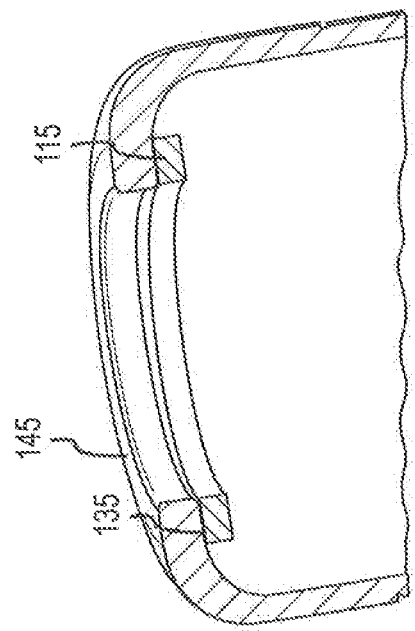
FIG. 1B illustrates a cut-away view of the EMA housing of FIG. 1A.
Figure 1A:
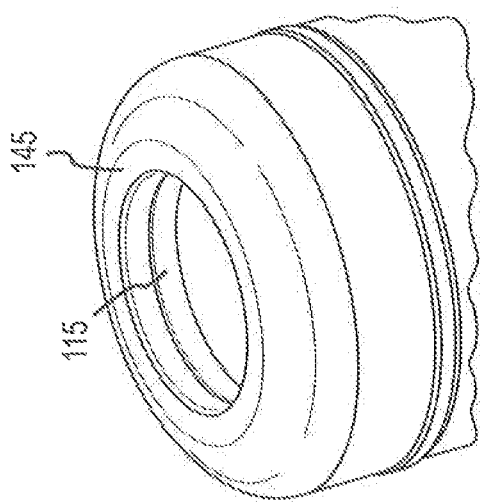
FIG. 1A illustrates an isometric view of the top portion of a conventional EMA housing having no reinforcement ring.
Figure 1C:
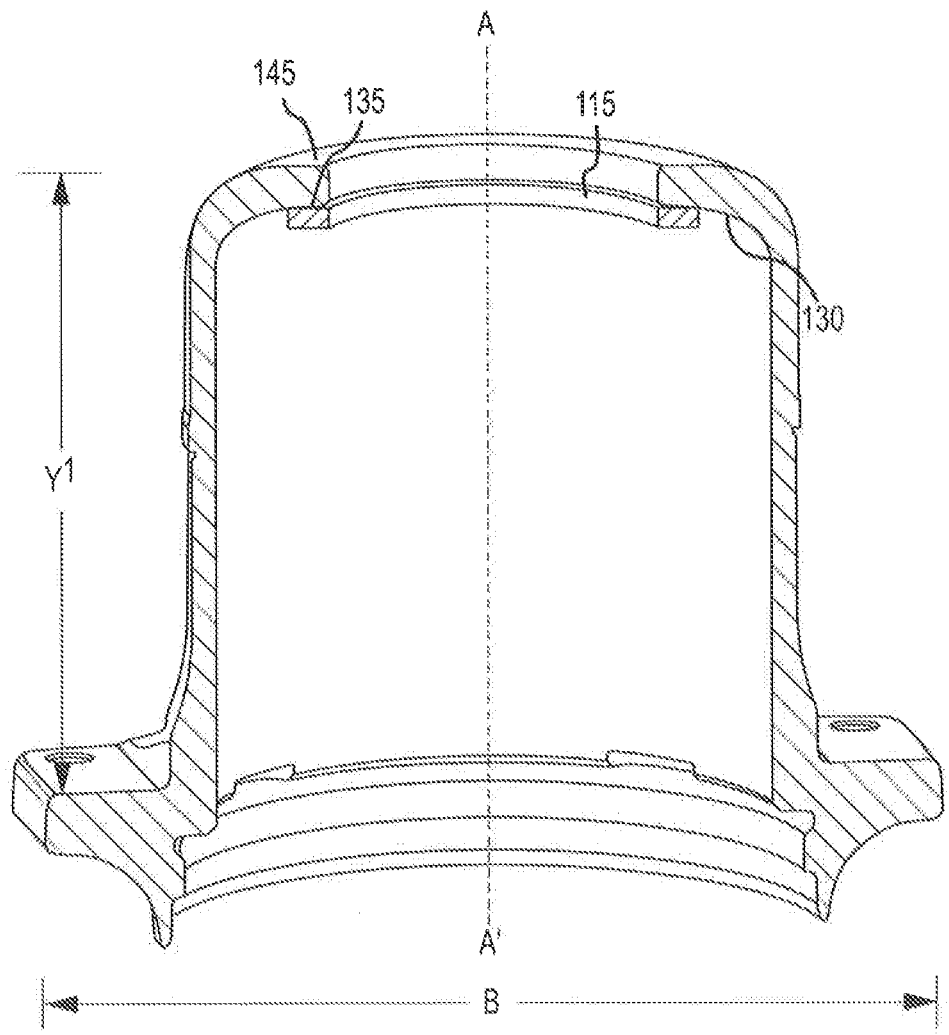
FIG. 1C illustrates a cut-away view of a conventional EMA housing having no reinforcement ring.

Accurate load cell measurements are difficult to achieve with the conventional EMA housing designs (See FIGS. 1A-1C). FIGS. 1A through 1C show an EMA housing without a reinforcement ring atop the housing. It has been observed that the load cells of these conventional EMA housings have been subject to drift errors which then leads to re-trimming in the assembly to regain the desired load measurement accuracy. Housing deflections are a primary reason for these inaccuracies.

Figure 2:
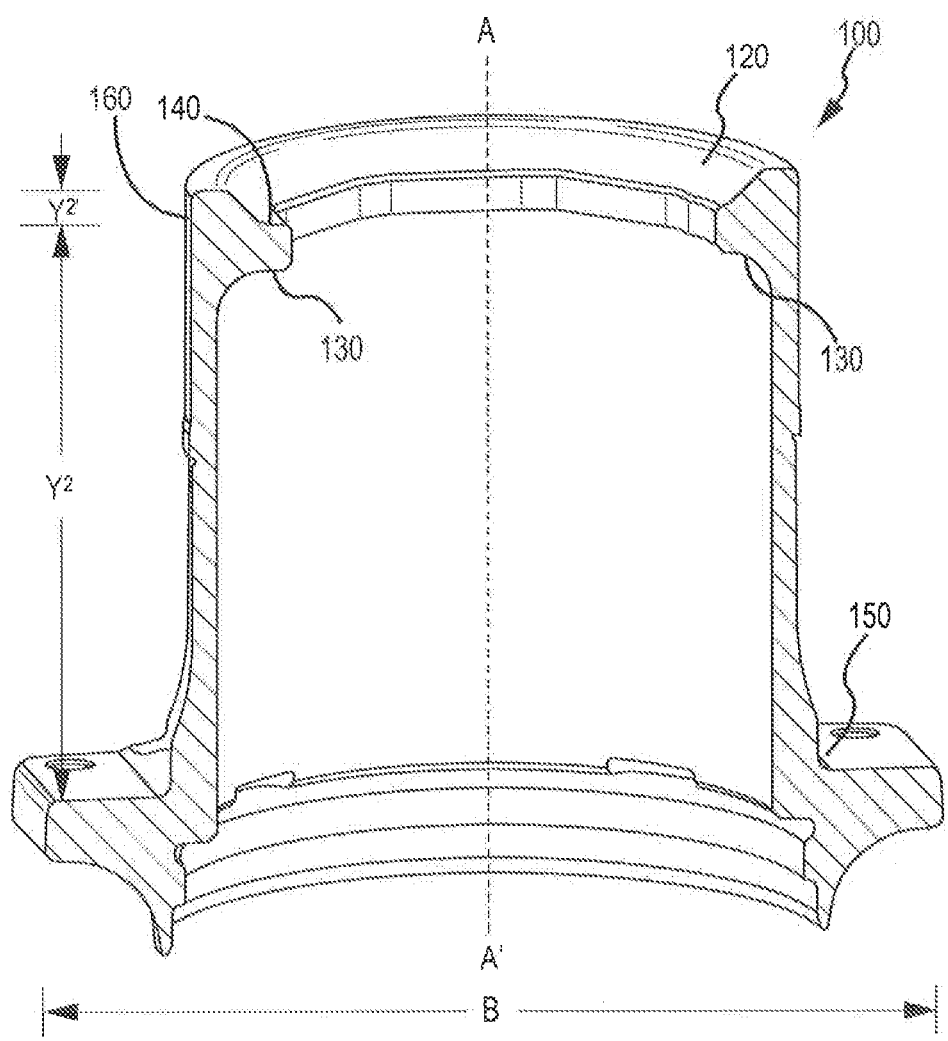
FIG. 2 illustrates a cut-away view of an EMA housing having a reinforcement ring in accordance with embodiments of the present disclosure.

According to various embodiments and with reference to FIG. 2, an EMA housing assembly 100 in accordance with the present disclosure comprises a reinforcement ring 120. Axis A to A' is shown for reference. Point A' may be referred to as distal to point A and point A may be referred to as proximal to point A.

Figure 3:
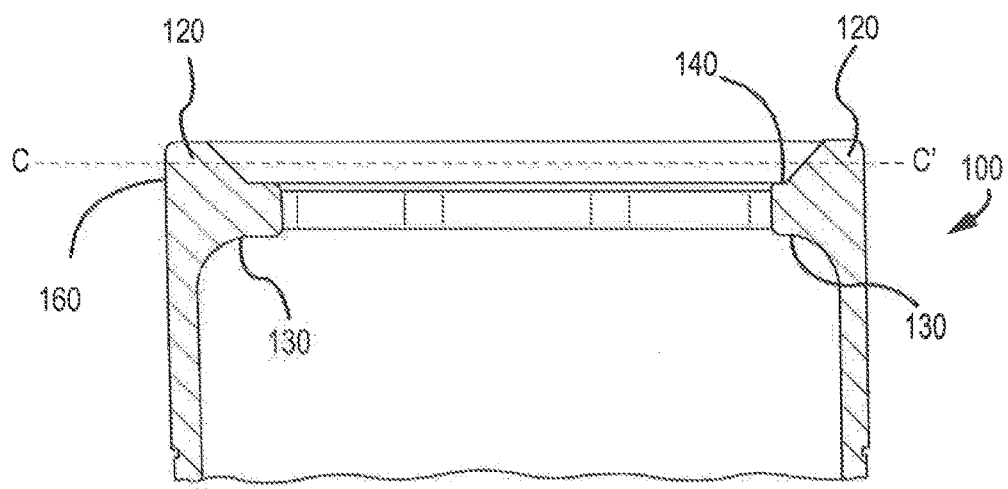
FIG. 3 illustrates a cut-away view of an EMA housing depicting reference plane C-C' in accordance with embodiments of the present disclosure.

As used herein, a reinforcement ring may be as any housing geometry that lies distal to the retaining surface, such as surface 130, of the EMA housing that decreases in axial distance from the mounting flange 150 while moving towards the axial centerline A-A' as measured from the exterior, such as surface 160, of the EMA housing. Similarly, reinforcement ring 120 changes in radial length as one moves proximally along axial centerline A-A'. With momentary reference to FIG. 3, reinforcement ring 120 comprises a housing geometry that varies above and below a plane, such as plane C, which is perpendicular to the axial centerline A-A' of the EMA housing (see FIG. 3). For instance, portions of the reinforcement ring 120 extend above plane C-C', while portions of reinforcement ring 120 do not reach plane C-C'. For instance, portions of the reinforcement ring 120 extend above plane C-C', while portions of reinforcement ring 120 do not reach plane C-C'. Reinforcement ring 120 may comprise a housing geometry that varies in radial distance from axial centerline A-A' along two parallel planes which are perpendicular to the axial centerline A-A' of the EMA housing. According to various embodiments, reinforcement ring 120 may be integrally formed in the housing assembly 100 located above retaining surface 130. Top surface 140 of reinforcement ring 120 may comprise a housing geometry which slopes in a proximal and/or downward direction moving towards the axial centerline A-A' of the EMA housing.

With renewed reference to FIG. 2, Length $Y^{2'}$ illustrates length of reinforcement ring 120 as measured at its longest distance. The total axial distance of EMA housing assembly 100 is $Y^2+Y^{2'}$, where $Y^2$ is the axial distance from mounting flange 150 to the top surface 140 above retaining surface 130 of EMA housing assembly 100. Reinforcement ring 120 does not have to add to overall EMA housing length as compared with conventional EMA housings, such as the EMA housings of FIGS. 1A-1C. Stated another way, in various embodiments, $Y^2+Y^{2'}$ may be equal to or less than $Y^1$ (See FIG. 1C).

As a comparison, the EMA housing in FIG. 1C does not have any geometry that decreases in axial distance while moving towards the EMA axial centerline A-A' as measured from the exterior of the EMA housing. Stated another way, top surface 145 of the EMA housing of FIG. 1 is substantially flat with no variation in axial length across its surface, in contrast, top surface 140 of EMA housing assembly 100 in FIG. 2 has geometry that decreases in axial distance while moving towards the EMA axial centerline A-A'.

Also, as a comparison, the portion of the EMA housing between top surface 145 and retaining surface 135 as shown in FIGS. 1A-1C, extends further towards the EMA axial centerline AA' as compared with the portion of the EMA housing assembly 100 between top surface 140 and retaining surface 130 as shown in FIG. 2. Stated another way, EMA housing assembly 100 comprises less material between retaining surface 130 and top surface 140, at its smallest measured axial length, extending towards axial centerline A-A' as compared with conventional EMA housing assemblies.

EMA housings in accordance with the present disclosure tend to reduce the probability of experiencing degraded load cell performance by decreasing housing deflections. Also, a device, such as a washer 115, generally located adjacent to a load cell sensor towards the bottom of the housing (surface 130), is no longer required as compared with washers 115 in prior EMA assemblies. This eliminates previous steel washers 115 utilized, which could be approximately ½ inches (1.27 centimeters) thick. This device/washer 115 may spread the load of the actuator to the housing and make the assembly more stiff to address, restrict and/or prevent deflections. This may assist in more accurate readings of the load cell, as thicker washers 115 may contribute to inconsistent readings as well as increase the mass and size of the conventional EMA housing assemblies. Also, due to the elimination of the washer 115, the overall EMA housing assembly 100 size may be reduced. This size reduction of the EMA housing assembly is highly desired by aerospace customers as weight of materials is a premium.

While not intending to be bound by theory, finite element models indicate an approximate 18.9% reduction in stress when using the reinforcement ring 120 design as compared to conventional designs. Also, the reinforcement ring 120 design may contribute to a negligible weight increase as compared to the non-reinforcement ring design, such as an increase in the the weight of the EMA housing assembly 100 by about 0.005 lbs (about 0.002268 kilograms) (less than 0.056%).

According to various embodiments, in a conventional EMA housing without a reinforcement ring, at 8,500 lbs actuation load, a measured maximum stress may be 44.9 ksi (309.6 megapascal). Also, the maximum measured deflection in inches may be 0.0141. In contrast, in EMA housing assembly 100 comprising reinforcement ring 120, at 8,500 lbs actuation load and made of the same material as the prior example, the maximum stress measured was 38.7 ksi (266.8 megapascal). Also, the maximum deflection measured in inches is 0.0084. Thus, in this case the percentage reduction in deflection by EMA housing assembly 100 over conventional designs (those not having a reinforcement ring) is 41 percent. Also, reduction in system stress is achieved with the designs described herein. For example, EMA housing assembly 100 may represent a reduction in system stress of between about 5 and 25 percent, between about 10 and 20 percent, and/or between about 12 and 15 percent. According to various embodiments, a reduction in system stress is 14 percent.

The deflection of EMA housing assembly 100 is also reduced by nearly 50% as compared with conventional EMA housing assemblies. A lower amount of deflection tends to greatly improve the amount of load cell gain as well as the accuracy of the load cell inside EMA housing assembly 100 by not introducing off axis loading. This improves the function of EMA housing assembly 100 and the performance of the brake control system it supports. Thus, the performance of EMA housing assembly 100 is improved without increasing the weight or only slightly increasing the weight as compared with other EMA housings.

According to various embodiments, and though it may be made from any suitable material, EMA housing assembly 100 comprises at least one of a forged aluminum housing, steel housing, machined carbon composite, and/or the like. A forged aluminium housing keeps stress levels to those that meet EMA housing life goals as well as achieves a reduction of EMA weight compared to that of a steel housing.

According to various embodiments and with reference to FIGS. 4A and 4B, EMA housing assembly 100 may comprise an aperture 170 configured to receive a data acquisition unit (ADU) motor housing, and restrict or prevent its rotation which may be secured using a motor retention nut. Aperture 170 may be defined as a surface that bounds a cavity of EMA housing assembly 100. Aperture 170 may be sized such that the ADU motor retention nut be embedded in the EMA housing such that a portion of the motor retention nut is positioned proximal to top surface 140 of EMA housing assembly 100. Aperture 170 may be sized such that, in response to being properly installed, substantially all the DU motor retention nut is positioned proximal to top surface 140 of EMA housing assembly 100. Aperture 170 may be shaped such that its perimeter is complementary to the exterior surface of the ADU motor retention nut. The ADU motor retention nut may be moved (e.g. tightened/removed) through the use of a spanner out tool or other suitable device.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein, in the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

The invention claimed is:

1. An electromechanical actuator (EMA) housing assembly comprising:
a reinforcement ring integrally formed in the housing assembly with a retaining surface located axially between the reinforcement ring and a mounting flange of the housing assembly, wherein the retaining surface comprises a polygonal geometry, wherein the reinforcement ring is disposed distal to the mounting flange of the housing assembly, wherein the reinforcement ring has a tapered geometry.

2. The EMA housing assembly of claim 1, wherein the reinforcement ring comprises a housing geometry that varies across two parallel planes perpendicular an axial centerline of the EMA housing.

3. The EMA housing assembly of claim 1, wherein the EMA housing is a forged aluminum EMA housing.

4. The EMA housing assembly of claim 1, wherein a surface of the integral reinforcement ring comprises an exposed surface of the EMA housing assembly.

5. The EMA housing assembly of claim 1, wherein the maximum stress of the EMA housing assembly measured at 8500 lbs actuation load is less than or equal to 38.7 ksi.

6. The EMA housing assembly of claim 1, further comprising a surface that bounds a cavity.

7. The EMA housing assembly of claim 1, wherein the EMA housing assembly is installed on an aircraft.

8. The EMA housing assembly of claim 1, wherein there is no washer proximate the reinforcement ring.

* * * * *